United States Patent
Wakchaure et al.

(10) Patent No.: US 9,354,973 B2
(45) Date of Patent: May 31, 2016

(54) DATA INTEGRITY MANAGEMENT IN MEMORY SYSTEMS

(71) Applicant: Intel Corporation, Santa Clara, CA (US)

(72) Inventors: Yogesh B. Wakchaure, Folsom, CA (US); Xin Guo, San Jose, CA (US); Robert E. Frickey, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 13/798,370

(22) Filed: Mar. 13, 2013

(65) Prior Publication Data

US 2014/0281813 A1  Sep. 18, 2014

(51) Int. Cl.
*G06F 11/00* (2006.01)
*G06F 11/10* (2006.01)

(52) U.S. Cl.
CPC .................................... *G06F 11/108* (2013.01)

(58) Field of Classification Search
CPC ... G06F 11/10; G06F 11/1076; H04L 1/0057; H03M 13/116; G11B 20/1833
USPC .......................................................... 714/801
See application file for complete search history.

(56) References Cited

U.S. PATENT DOCUMENTS

| 6,563,816 | B1* | 5/2003 | Nodoushani | H04L 12/66 370/352 |
| 7,554,983 | B1* | 6/2009 | Muppala | H04L 12/2697 370/392 |
| 8,225,181 | B2* | 7/2012 | Perlmutter et al. | 714/773 |
| 2010/0199125 | A1* | 8/2010 | Reche | 714/6 |
| 2014/0156966 | A1* | 6/2014 | Ellis et al. | 711/173 |
| 2014/0164881 | A1* | 6/2014 | Chen et al. | 714/773 |
| 2014/0351675 | A1* | 11/2014 | Tiziani et al. | 714/773 |

\* cited by examiner

*Primary Examiner* — Albert Decady
*Assistant Examiner* — Enam Ahmed
(74) *Attorney, Agent, or Firm* — Chapin IP Law, LLC

(57) ABSTRACT

Data management logic allocates a portion such as a single plane of a respective multi-plane non-volatile memory device to store parity information for corresponding data striped across multiple planes of multiple non-volatile memory devices. According to one configuration, the data management logic as discussed herein generates parity data based on (a data stripe of) non-parity data stored in multiple planes of multiple different memory devices. The data management logic stores the parity data in the storage plane allocated to store the parity information. Additional configurations include: reserving a parity block amongst multiple non-parity data blocks to store parity data and reserving a parity page amongst multiple non-parity data pages to store parity data.

27 Claims, 11 Drawing Sheets

DATA INTEGRITY MANAGEMENT IN MEMORY SYSTEMS

TECHNICAL FIELD

Embodiments of the present disclosure relate generally to data management in a memory system.

BACKGROUND

Computer systems have long used devices to store data. For example, a conventional Hard Disk Drive (HDD) is a data storage device used for storing and retrieving digital information using rapidly rotating discs. The discs are coated with magnetic material that persistently stores respective data. As a respective disc rotates, a magnetic head reads data from or writes data to the magnetic material on the surface of the disk.

Another type of conventional technology to store data is a solid state-drive. As its name suggests, a solid state-drive includes one or more solid-state devices or integrated circuits that are configured to persistently store data. There are no actual moving parts in a solid state-drive. Access to data is performed using an electronic circuit interface.

One reason for the widespread use of a solid state-drives in lieu of rotating disk drives is speed. For example, access to data in non-volatile memory is typically much quicker than access to data stored in a disk (e.g., a physically rotating storage medium). A downside of using non-volatile memory as opposed to disk drive storage is cost. For example, the cost per bit to store data in memory can be considerably higher than the cost per bit to store data on a magnetic media disc of a HDD.

Memory systems typically include many storage elements to store bits of information. Any of the many storage elements can fail over the useful life of the memory system. Proper management of the failing elements in the memory system is important for longevity and usefulness.

One conventional way to reduce the impact of failing memory is to generate parity information for stored data. In certain instances, the parity information can be used to restore unavailable data.

More specifically, according to conventional techniques, a memory system may include a sequence of multiple memory devices to store data. A technique known as data striping can be used to store a respective portion of corresponding data in each of the multiple memory devices in the sequence. In accordance with conventional applications, all storage elements or cells in a respective memory device, such as the last memory device in the sequence, can be reserved to store parity data for stripe data. The parity data can be generated in any suitable manner such as via application of a logical operation to the striped non-parity data. Upon detecting a condition such as the unavailability of data from a particular device in the sequence of memory devices, the parity data in the last memory device can be used to restore the unavailable data.

DESCRIPTION OF THE EMBODIMENTS

Figure 1:
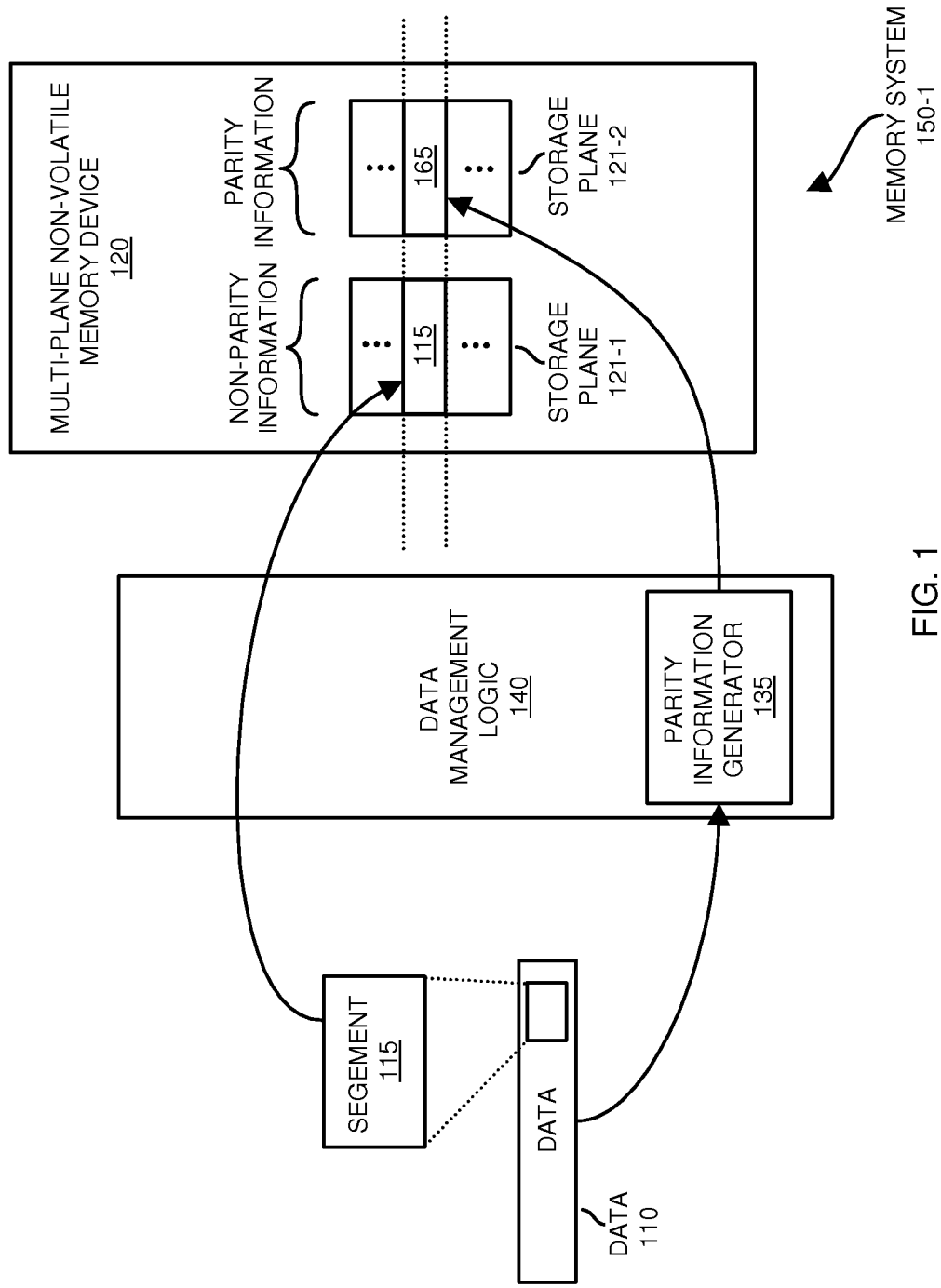
FIG. 1 is an example diagram illustrating management of data in a memory system according to embodiments herein.

Memory systems such as those including one or more non-volatile memory devices are prone to failure for a number of reasons.

For example, memory devices are prone to failures that occur as a result of fabrication defects. Fabrication defects (e.g., extrinsic-type failures) can be caused by exposure of a die to particles, scratches on the die, etc. Typically, these types of failures occur early in a life of the memory device.

Memory systems are also prone to late life type of failures (e.g., intrinsic-type failures). For example, memory systems are typically designed to handle repeated (e.g., many thousands of) read/writes before occurrence of a failure. However, a high number of repeated accesses to the same memory cell can wear out an oxide layer of a floating gate in a cell, resulting in the inability to store data in the cell. Thus, eventually, an excessive number of accesses will cause a respective cell to fail.

Memory failures can occur at different levels. For example, in certain instances, an entire page or block in a respective memory device may fail. In more extreme cases, the entire memory device may fail.

Certain conventional multi-plane non-volatile memory devices typically include multiple independently operating storage planes. A typical multi-plane non-volatile memory device can include any number of storage planes such as two storage planes, four storage planes, etc.

Each of the multiple storage planes in a respective conventional multi-plane memory device can be operated independently of each other. For example, a storage device can include first interface circuitry to access data in a first storage plane of the device; the storage device can include second interface circuitry to access data in a second storage plane of the device; and so on. If desired, the first interface circuitry can be configured to access the first plane while the second interface circuitry accesses data from the second plane.

Thus, a conventional storage device including multiple planes (and corresponding access circuitry) can simultaneously transfer data in and out of multiple different memory planes, increasing overall data access performance compared to single plane storage devices.

A storage plane and/or corresponding access interface circuitry in a multi-plane storage device may fail. Because the planes and respective interface circuitry operate independently of each other, access to a first storage plane in the respective multi-plane memory device may fail, but access to a second storage plane may continue to work properly.

Certain embodiments as discussed herein are based at least in part on the discovery that the occurrence of a multiple-plane defect is typically low compared to occurrence of a single plane defect. In other words, in certain instances, it is considerably more likely that a given multi-plane non-volatile memory device will experience a single storage plane failure in which only data in the single failing storage plane cannot be retrieved as opposed to a multiple-plane failure in which data in each of the failing storage planes cannot be retrieved.

More specifically, certain embodiments herein are directed to a novel manner of managing data such as producing and storing parity information for stored data at the plane level. For example, in one non-limiting example embodiment, in contrast to conventional techniques, data management logic allocates a portion such as a single plane of a respective multi-plane non-volatile memory device to store parity information for corresponding data striped across multiple planes of multiple non-volatile memory devices. In one embodiment, the data management logic as discussed herein generates parity data based on (a stripe of) non-parity data, segments of which are stored in each of multiple planes of respective memory devices. The data management logic stores the parity data in the storage plane allocated to store the parity information. Thus, embodiments herein include plane-level parity generation and storage.

In the event of a non-parity storage plane failure, the data management logic reproduces a copy of the lost or inaccessible data for the failed non-parity storage plane based at least in part on data retrieved from other non-failing storage planes that store non-parity data as well as respective parity data stored in the plane allocated to store the parity information. Accordingly, in the event that only a single plane of a multi-plane non-volatile memory device happens to fail, the data management logic as discussed herein is able to recover data stored in the failing storage plane of the multi-plane non-volatile memory device.

Storage of the parity information in fewer than all planes of a respective multi-plane non-volatile memory device increases an amount of storage resources available for storage of non-parity information. By way of a non-limiting illustrative example, a multi-plane non-volatile memory device may include four planes. In contrast to conventional techniques, and in accordance with one embodiment herein, one of the four storage planes of the multi-plane non-volatile memory device can be allocated to store the parity information; the three remaining storage planes can be used to store non-parity information. In such an instance, 75% of available storage (or 3 out of the 4 storage planes) in the multi-plane non-volatile memory device can be used to store non-parity information. As a comparison, conventional techniques include allocating all available cells in a memory device to store respective parity information; leaving 0% of available storage in the non-volatile memory device to store non-parity information. Thus, embodiments herein provide a more efficient use of storage resources. That is, in this example case as discussed above, 75% of a multi-plane non-volatile memory device can be allocated to store non-parity information.

Now, more specifically, FIG. 1 is an example diagram illustrating an implementation of a memory system according to embodiments herein.

As shown, example memory system 150-1 includes data management logic 140 and at least one multi-plane non-volatile memory device 120. Memory system 150-1 may be part of an apparatus such as a Solid State-Drive (SSD) including multiple memory devices. A technique of data striping can be used to store the data in the memory devices.

The memory system 150-1 and/or data management logic 140 can include hardware, software, firmware, etc., to perform any of the functions (e.g., data access, generation of parity information, memory repair, etc.) as discussed herein.

Note that each of the resources disclosed in FIG. 1 can be any suitable type of resource. For example, the multi-plane non-volatile memory device 120 (e.g., NAND flash, NOR flash, Magnetoresistive Random Access Memory, Ferroelectric Random Access Memory, 3-D memory, personal computer memory system, etc.) can include multiple storage planes to store data. The data management logic 140 and its components can be executed via any suitable type of resource such as an ASIC (Application Specific Integrated Circuit), processor executing instructions, firmware, hardware, software, etc.

In accordance with a general embodiment as shown in FIG. 1, the data management logic 140 allocates storage plane 121-1 (such as at least one and fewer than all storage planes) of the multi-plane non-volatile memory device 120 to store non-parity information. The data management logic 140 allocates storage plane 121-2 (or at least one but fewer than all storage planes) to store parity information.

During operation, the data management logic 140 produces or obtains parity data 165 associated with data 110. In one embodiment, the parity information generator 135 of data management logic 140 derives or calculates the parity data 165 based on data 110. The data management logic 140 initiates storage of the parity data 165 at the appropriate address in the storage plane 121-2 of the multi-plane non-volatile memory device 120. In one embodiment, the data management logic 140 stores segment 115 (e.g., all or a portion of data 110) in the storage plane 121-1 as shown.

Accordingly, embodiments herein can include allocating at least one and fewer than all storage planes of a multi-plane non-volatile memory device 120 to store parity information.

These and additional permutations of memory system 150-1 are further discussed below in the following figures.

Figure 2:
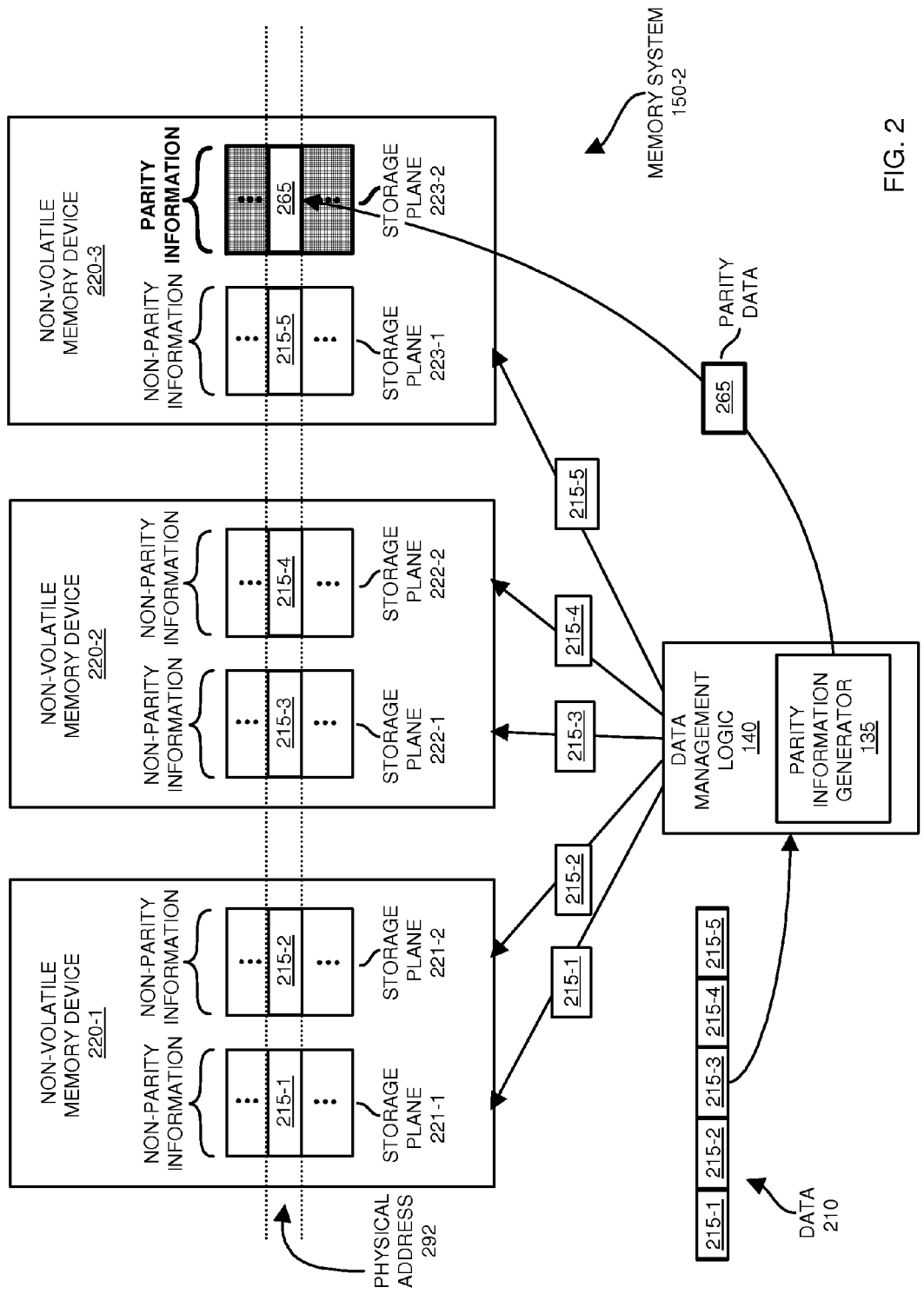
FIG. 2 is an example diagram illustrating generation and storage of parity information in a memory system according to embodiments herein.

FIG. 2 is an example diagram illustrating storage of non-parity information as well as generation and storage of parity information in a memory system including multiple non-volatile memory devices according to embodiments herein.

As shown, memory system 150-2 includes multiple non-volatile memory devices 220 (collectively, non-volatile memory device 220-1, non-volatile memory device 220-2, and non-volatile memory device 220-3). Although this non-limiting example discusses use of three multi-plane memory devices to store data, note that the memory system 150-1 can include any number of devices to store data via data striping.

In one non-limiting example embodiment, each of the non-volatile memory devices 220 includes multiple storage planes. For example, as shown in this non-limiting example embodiment, non-volatile memory device 220-1 includes storage plane 221-1 and storage plane 221-2. Non-volatile memory device 220-2 includes storage plane 222-1 and storage plane 222-2. Non-volatile memory device 220-3 includes storage plane 223-1 and storage plane 223-2.

Note that each of the non-volatile memory devices 220 can include any number of storage planes. For illustrative purposes, this example includes two storage planes per device. As discussed, each memory device can include any suitable number of planes to store data.

Additionally, note that each of the storage planes can include multiple blocks, each of the blocks can include multiple pages of storage cells.

In this example embodiment, assume that the data management logic receives data 210 to be stored in non-volatile memory devices 220. Data 210 can include segment 215-1, segment 215-2, segment 215-3, segment 215-4, and segment 215-5. Each of the segments 215 can include a sequence of data bits such as a page of data to be stored in a respective plane of a non-volatile memory device.

Data management logic 140 allocates each of the storage planes of respective non-volatile memory devices 220 to store a portion of data. For example, data management logic 140 allocates storage plane 221-1 of non-volatile memory device 220-1 to store non-parity information; data management logic 140 allocates storage plane 221-2 of non-volatile memory device 220-1 to store non-parity information; data management logic 140 allocates storage plane 222-1 of non-volatile memory device 220-2 to store non-parity information; data management logic 140 allocates storage plane 222-2 of non-volatile memory device 220-2 to store non-parity information; data management logic 140 allocates storage plane 223-1 of non-volatile memory device 220-3 to store non-parity information; data management logic 140 allocates storage plane 223-2 of non-volatile memory device 220-3 to store parity information.

As shown in FIG. 2, embodiments herein include data striping. For example, as previously discussed, data 210 received by the data management logic 140 represents a sequence of bit information including multiple segments 215. The data management logic 140 stores the segments 215 of data 210 across multiple storage planes in different memory storage devices at a specified physical address such as physical address 292.

More specifically, in this non-limiting example embodiment, the data management logic 140 stores segment 215-1 of data 210 in a respective page of storage plane 221-1 at physical address 292 of non-volatile memory device 220-1; the data management logic 140 stores segment 215-2 of data 210 in a page of storage plane 221-2 at physical address 292 of non-volatile memory device 220-1; the data management logic 140 stores segment 215-3 of data 210 in a page of storage plane 222-1 at physical address 292 of non-volatile memory device 220-2; the data management logic 140 stores segment 215-4 of data 210 in a page of storage plane 222-2 at physical address 292 of non-volatile memory device 220-2; the data management logic 140 stores segment 215-5 of data 210 in a page of storage plane 223-1 at physical address 292 of non-volatile memory device 220-3.

In furtherance of storing segments 215 of the data 210 in the respective storage planes of non-volatile memory devices 220, the parity information generator 135 generates parity data 265 based at least in part on the segments 215 of data 210. For example, in one embodiment, the parity information generator 135 generates parity data 265 using an appropriate logic function.

In one non-limiting example embodiment, assume that the parity information generator 135 applies an XOR function to each of segments 215 to produce the parity data 265. The data management logic 140 can be configured to store the segments 215 of data 210 in the respective planes at a substantially same time as storing the parity data in storage plane 223-2. For example, in one embodiment, at substantially the same time, the data management logic 140 stores: i) the segment 215-1 at physical address 292 in storage plane 221-1, ii) the segment 215-2 at physical address 292 in storage plane 221-2, iii) the segment 215-3 at physical address 292 in storage plane 222-1, iv) the segment 215-4 at physical address 292 in storage plane 222-2, v) the segment 215-5 at physical address 292 in storage plane 223-1, and vi) the parity data 265 at physical address 292 in storage plane 223-2.

As a yet more specific example, assume that: segment 215-1 includes bits 10110 . . . , segment 215-2 includes bits 00010 . . . , segment 215-3 includes bits 01111 . . . , segment 215-4 includes bits 11100 . . . , segment 215-5 includes bits 00000 . . . . In this example, the parity information generator 135 applies an XOR function to the segments to produce the parity data 265 to include bits: 00111 . . . . For example, the parity information generator 135 produces the parity data 265 based on:

parity data 265=(segment 215-1) XOR (segment 215-2) XOR (segment 215-3) XOR (segment 215-4) XOR (segment 215-5)

As mentioned, data management logic 140 stores the parity data 265 (e.g., bit sequence 00111 . . . ) in storage plane 223-2 as shown.

Accordingly, embodiments herein can include partitioning the corresponding data 210 into multiple segments 215 of data. The data management logic 140 stores the multiple segments 215 of data 210 as a data stripe across the multiple multi-plane non-volatile memory devices 220 of the memory system 150-2.

In a similar manner as discussed above for storing data at physical address 292, embodiments herein can include generating parity data and storing respective data at different addresses.

Figure 3:
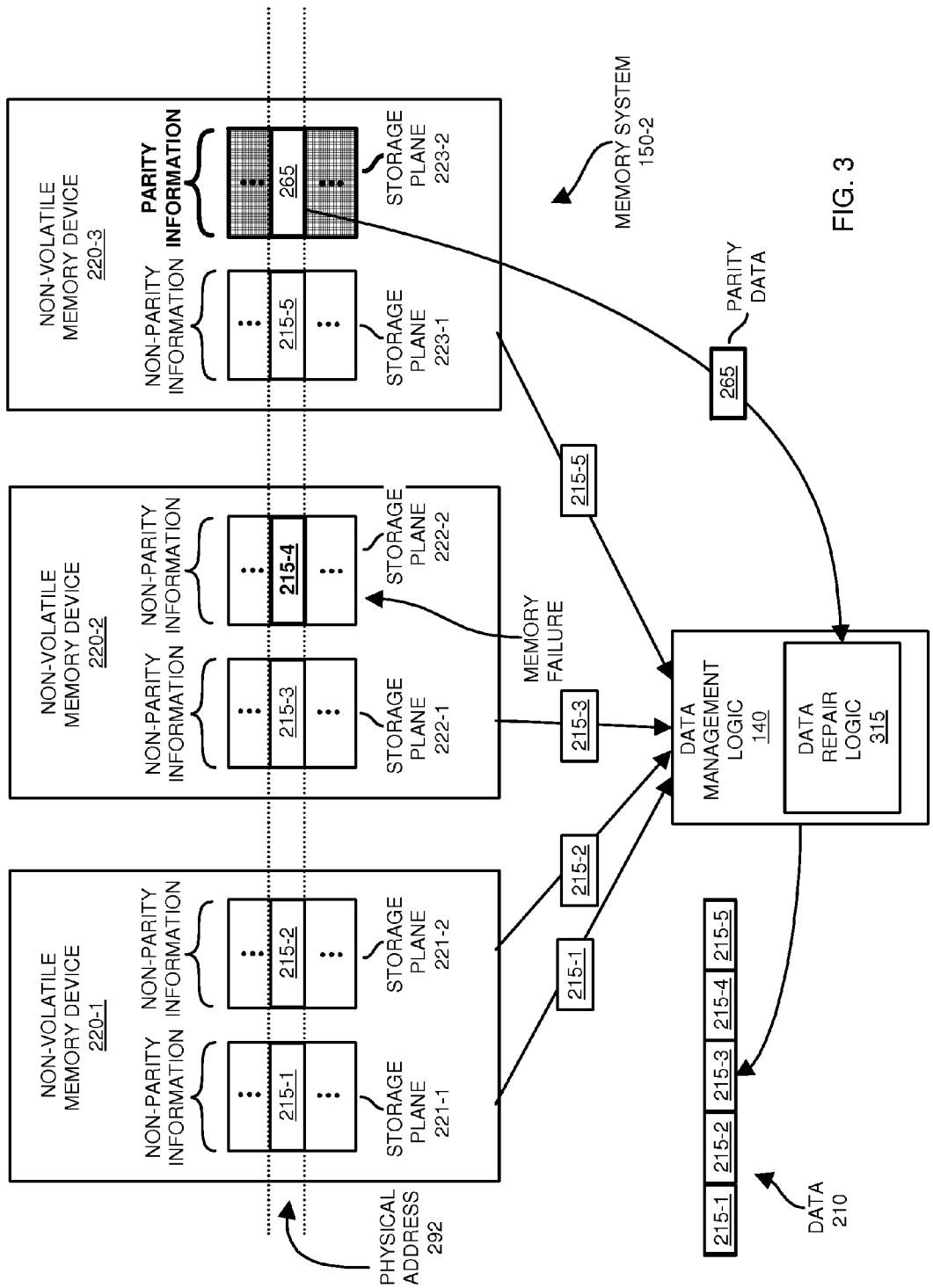
FIG. 3 is an example diagram illustrating use of parity information to recover from a memory failure according to embodiments herein.

FIG. 3 is an example diagram illustrating use of parity information to recover from a memory failure according to embodiments herein.

In this example, assume that there is a memory failure associated with at least the non-parity information (e.g., segment 215-4) stored in storage plane 222-2 at physical address 292. The memory failure can be any type of failure such as a single of multiple cell failure, a page failure, block failure, plane failure, etc. Due to the memory failure, the segment 215-4 of data is unavailable.

Embodiments herein can include utilizing the parity data 265 to reproduce the non-retrievable or corrupted segment 215-4 in plane 222-2 of non-volatile memory device 220-2. For example, to reproduce the segment 215-4 of data, the data repair logic 315 of data management logic 140 retrieves the parity data 265 (00111 . . . ) stored in the storage plane 223-2 of the (multi-plane) non-volatile memory device 220-3. The data repair logic 315 also retrieves the available data (e.g., segment 215-1, segment 215-2, segment 215-3, and segment 215-4) at physical address 292 from respective non-volatile memory devices 220 as shown. In this non-limiting example embodiment, the data repair logic 315 generates the value for segment 215-4 based on:

segment 215-4=(segment 215-1) XOR (segment 215-2) XOR (segment 215-3) XOR (parity data 265) XOR (segment 215-5)=11100 . . . .

In this and similar manner, the parity information stored in the storage plane 223-2 of non-volatile memory device 220-3 can be used to reproduce respective non-parity information stored at one or more physical addresses of a failing storage plane.

Figure 4:
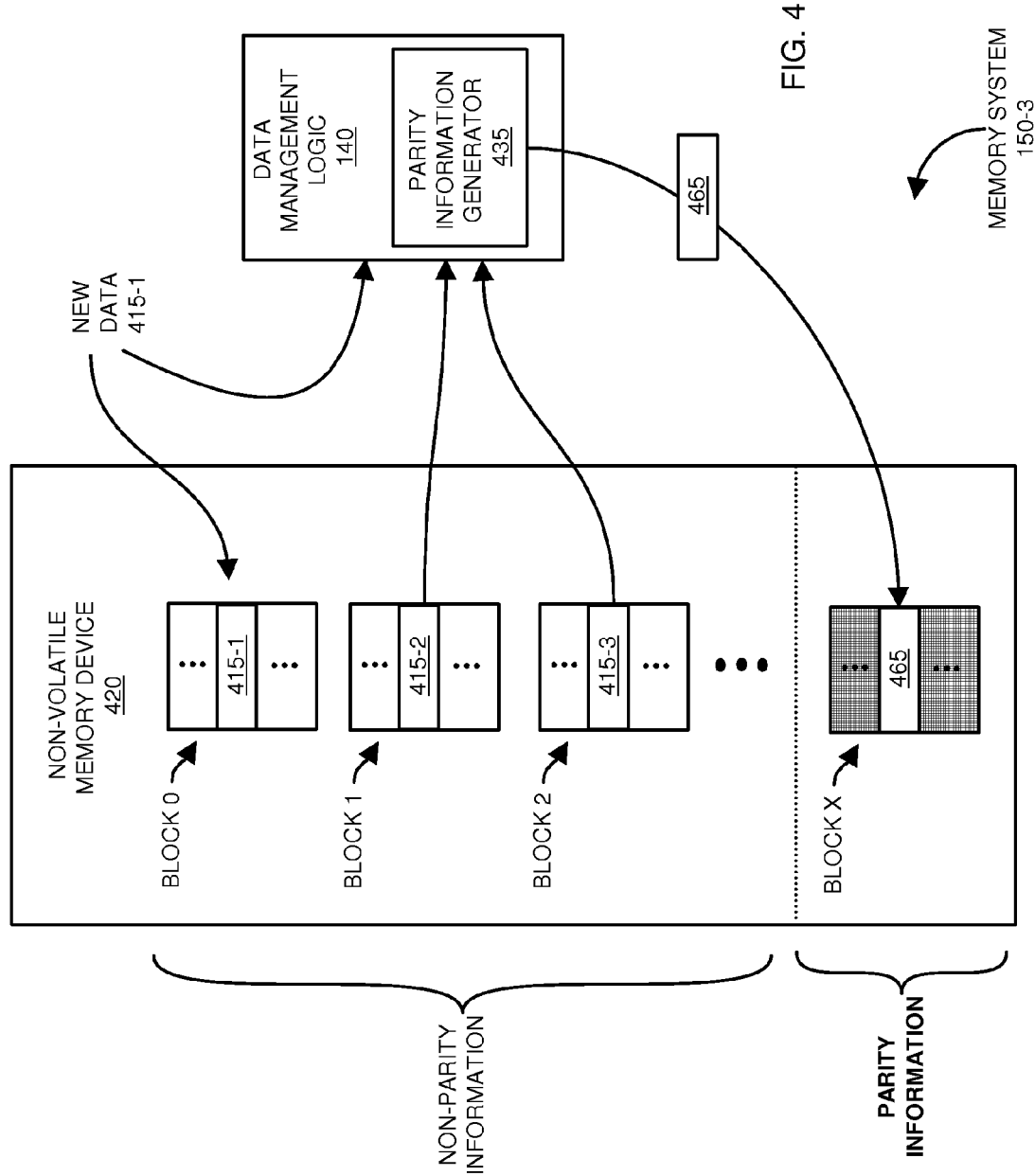
FIG. 4 is an example diagram illustrating generation and storage of parity information at a block level according to embodiments herein.

FIG. 4 is an example diagram illustrating generation and storage of parity information at a block level according to embodiments herein.

As shown, non-volatile memory device 420 of memory system 150-3 includes multiple blocks including block 0, block 1, block 2, . . . , block X. The data management logic 140 allocates one or more blocks in non-volatile memory device 420 to store non-parity information. The data management logic 140 allocates one or more blocks to store parity information. Each block of non-volatile memory device 420 can be configured to include a predetermined number of pages of storage cells to store respective data.

In this non-limiting example embodiment, assume that the data management logic 140 allocates a first portion of non-volatile memory device 420 such as block 0, block 1, block 2, . . . , block X-1 , to store non-parity information. Assume further in this non-limiting example embodiment that the data management logic 140 allocates a second portion of the non-volatile memory device 420 such as block X to store parity information.

Assume in this example that the data management logic 140 receives data 415-1 for storage in block 0. The data management logic 140 initiates storage of data 415-1 in an appropriate page offset of block 0 as shown. Assume that block 1 may already stores data 415-2 at the same page offset; block 2 already stores data 415-3 at the same page offset; and so on.

In addition to storing data 415-1 in the appropriate page offset of block 0, the data management logic 140 produces parity data 465. In one embodiment, to produce parity data 465, the parity information generator 435 retrieves data 415-1 (if needed) as well as data 415-2, data 415-3, etc., from each block allocated to store non-parity information.

More specifically, in one embodiment, assume that the data 415-1 is stored at a particular offset page (such as at page number Y) in block 0. To produce the parity data 465, the parity information generator 435 retrieves the corresponding data (e.g., data 415-2) stored in page Y of each respective block allocated to store of non-parity information. For example, the parity information generator 435 retrieves (if needed) the corresponding data (e.g., data 415-1) stored in page Y of each block such as block 0; the parity information generator 435 retrieves the corresponding data (e.g., data 415-2) stored in page Y of block 1; the parity information generator 435 retrieves the corresponding data (e.g., data 415-3) stored in page Y of block 2; and so on.

As a non-limiting example, assume that X=3 and that the block 3 stores parity data for a combination of blocks 0, 1, and 2. In such an instance, the parity information generator 435 produces the parity data 465 based on applying a logical bit operation such as a an XOR operation:

parity data 465=(data 415-1) XOR (data 415-2) XOR (data 415-3)

As a yet more specific example, assume that data 415-1 includes bits 01110 . . . , data 415-2 includes bits 00001 . . . , and data 415-3 includes bits 11100 . . . .

In this example, the parity information generator 135 applies an XOR function to the data 415-1, data 415-2, and data 415-3 to produce the parity data 465 (e.g., sequence of bits 10011 . . . ). For example, the parity information generator 135 produces the parity data 465 based on:

parity data 465=(01110 . . . ) XOR (00001 . . . ) XOR (10011 . . . )=(11100 . . . )

As shown, the data management logic 140 initiates storage of the parity data 465 (e.g., 11100 . . . ) at page Y of block X.

Accordingly embodiments herein can include obtaining parity data 465 derived from corresponding data (e.g., data 415-1, data 415-2, data 415-3, etc.) stored in the first portion (e.g., blocks 0, 1, 2, . . . ) of the non-volatile memory device 420 and initiating storage of the parity data 465 in a respective page such as page Y of block X of the non-volatile memory device 420.

In accordance with further embodiments, the data management logic 140 can be configured to perform sequential read operations (one read after another) to retrieve data 415-1, 415-2, 415-3, etc., from the non-volatile memory device 420 in order to generate parity data 465. The data management logic 140 further can be configured to initiate storage of the parity data 465 in block X of the non-volatile memory device 420 subsequent to storing the corresponding data 415-1 in block 0 of the non-volatile memory device 420.

In a manner as discussed above, each time the data management logic 140 initiates storage of new data in a respective page of a block of non-parity information (e.g., in any of blocks 0, 1, 2, . . . ), the data management logic 140 retrieves data (at the appropriate offset page) from the other non-written blocks and produces corresponding parity data for storage at the appropriate offset page in block X. Accordingly, embodiments herein include applying a logical bit operation to non-parity information (in the multiple blocks block 0, 1, 2, . . . ) to derive the respective non-parity information stored in block X of the non-volatile memory device 420.

Figure 5:
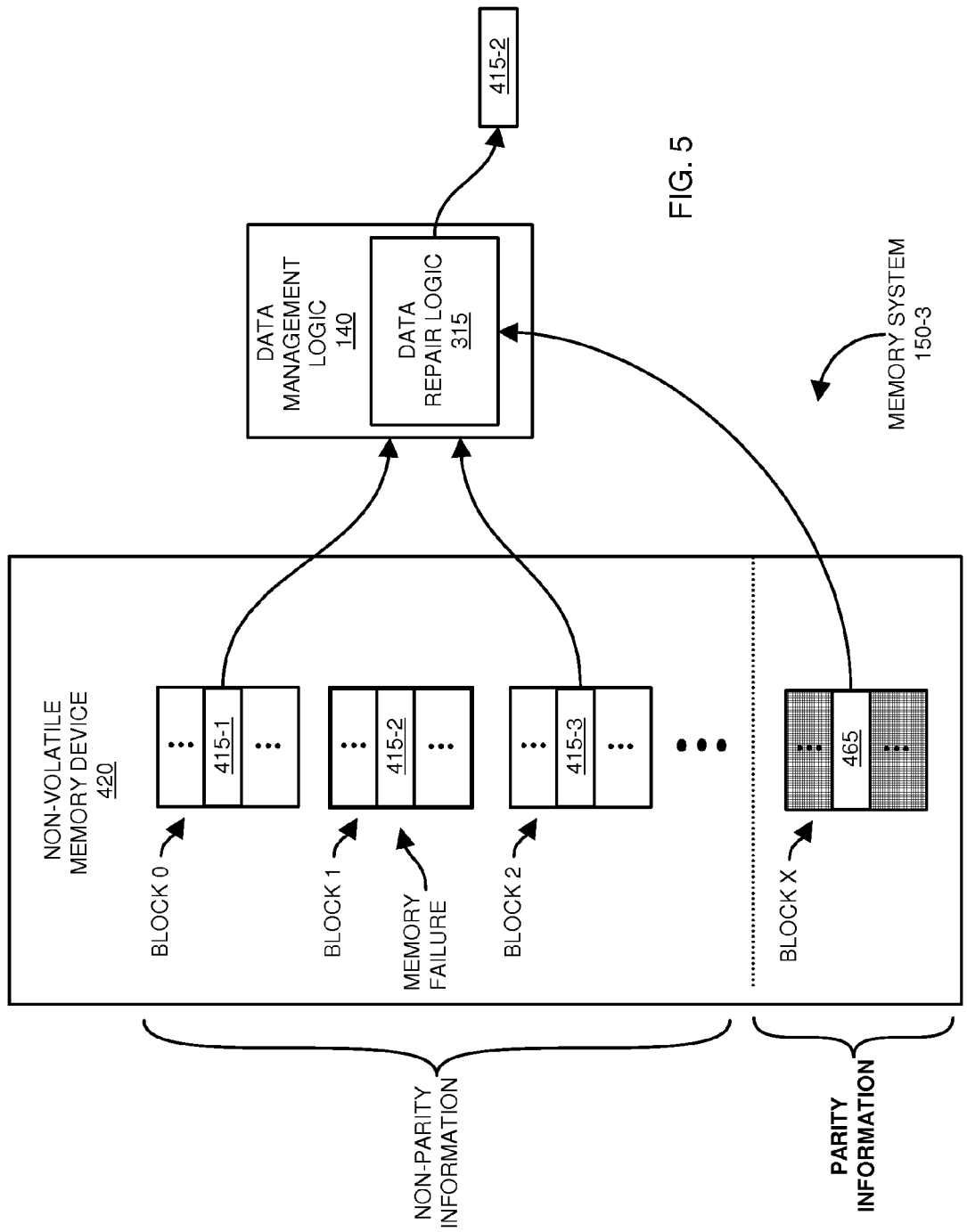
FIG. 5 is an example diagram illustrating use of parity information to recover from a memory failure at a block level according to embodiments herein.

FIG. 5 is an example diagram illustrating use of parity information to recover from a memory failure according to embodiments herein.

Assume there is memory failure associated with retrieval of data 415-2 previously stored in block 1 of the non-volatile memory device 420. The memory failure may occur for one of multiple reasons. For example, all of a portion of the page storing data 415-2 may fail; the block 1 may experience a failure, etc.

To reproduce inaccessible data 415-2 at offset page Y, the data repair logic 315 of the data management logic 140 initiates retrieval of data 415-1, data 415-3, and parity data 465. In accordance with the above example where X=3, the data repair logic 315 retrieves the parity data 465 (10011 . . . ) stored at page Y of block X. The data repair logic 315 also retrieves the available data (e.g., data 415-1 and data 415-2) at page Y of each respective block. The data repair logic 315 generates the value for segment 415-2 based on:

data 415-2=(data 415-1) XOR (data 415-3) XOR (parity data 465)=(01110 . . . ) XOR (10011 . . . ) XOR (11100 . . . )=(00001 . . . )

In this and a similar manner, the parity information stored in block X of non-volatile memory device 420 can be used to reproduce respective non-parity information stored at one or more pages of a failing block in the non-volatile memory device 420.

Accordingly, embodiments herein include obtaining at least a portion of data (e.g., data 415-1, data 415-3) stored in the first portion of the non-volatile memory device 420 and the parity data 465 stored in block X of the non-volatile memory device 420 to restore a corrupted or unavailable portion of data 415-2.

Figure 6:
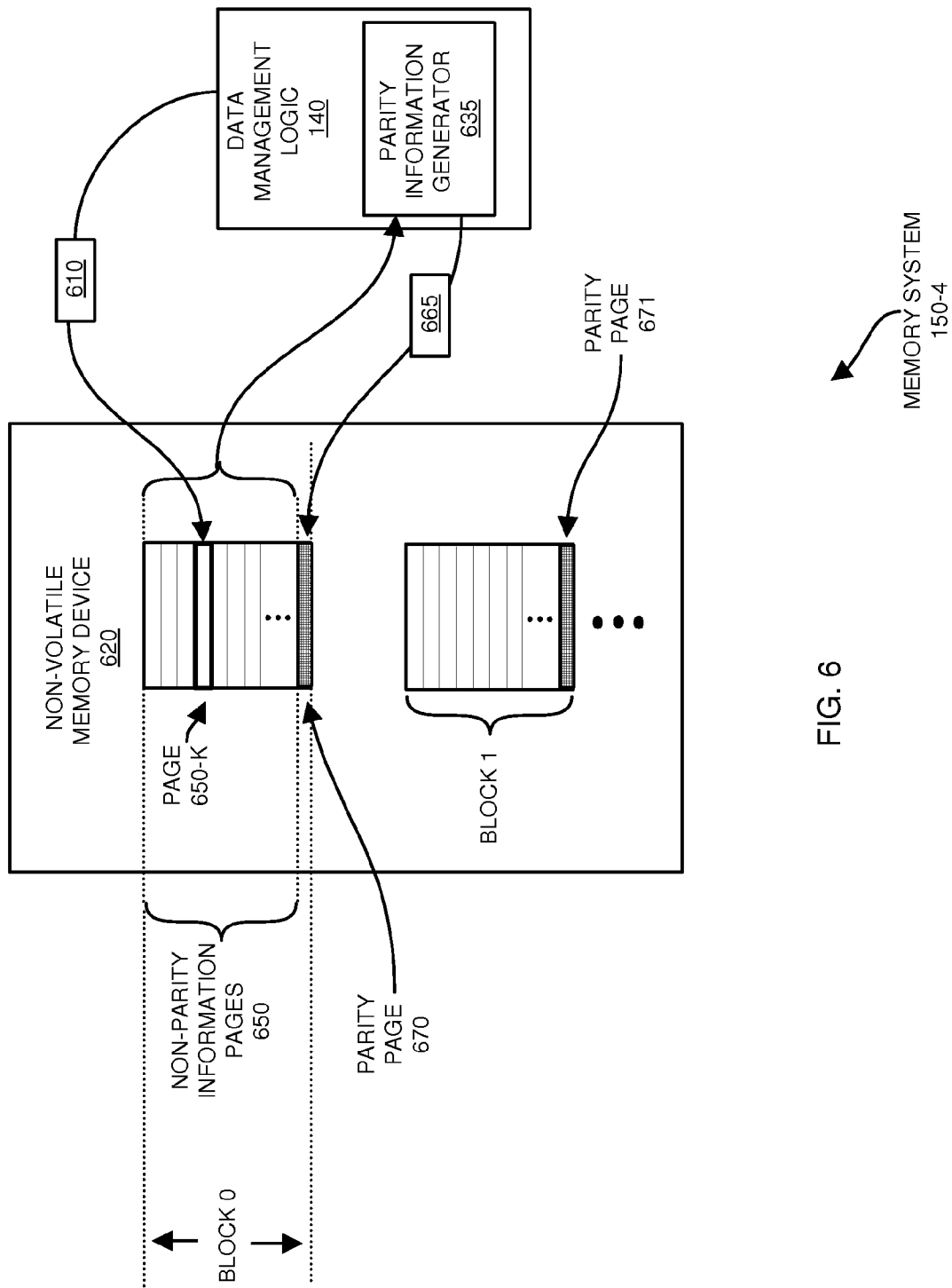
FIG. 6 is an example diagram illustrating generation and storage of parity information at a page level according to embodiments herein.

FIG. 6 is an example diagram illustrating generation and storage of parity information at a page level according to embodiments herein.

As shown, non-volatile memory device 620 of memory system 150-4 includes multiple blocks including block 0, block 1, etc. In this example embodiment, the data management logic 140 allocates one or more pages in each respective block of the non-volatile memory device 620 to store non-parity information. The data management logic 140 allocates one or more pages of the respective block to store parity information. Each block of non-volatile memory device 620 can be configured to include a predetermined number of pages of storage cells to store respective data.

In this non-limiting example embodiment, assume that the data management logic 140 allocates a first portion such as non-parity pages 650 of block 0 to store non-parity information. Assume further in this non-limiting example embodiment that the data management logic 140 allocates a second portion such as parity page 670 in block 0 to store parity information associated with non-parity pages 650.

As shown, data management logic 140 receives data 610 for storage in page 650-K of block 0. The data management logic 140 initiates storage of data 610 in page 650-K of block 0 as shown.

In addition to storing data 610 in page 650-K of block 0, the data management logic 140 produces parity data 665 for storage in parity page 670. In one embodiment, to produce parity data 665, the parity information generator 635 retrieves respective data from each page of non-parity information pages 650. The parity information generator 635 then applies a bit-wise operation such as an XOR function to the non-parity information pages 650 to produce parity data 665 for storage in parity page 670.

For sake of simplicity, assume that block 0 includes three non-parity information pages 650 and that a first page stores bits 11001 . . . , a second page stores 10111 . . . , and a third page (e.g., page 650-K) stores bits 10000 . . . .

The parity information generator 635 produces the parity data 665 based on applying a logical bit operation such as a an XOR operation:

parity data 665=(11001 . . . ) XOR (10111 . . . ) XOR (10000 . . . )=(11110 . . . )

The data management logic 140 initiates storage of the generated parity data 665 (e.g., 11110 . . . ) in parity page 670 of block 0.

In a similar manner, each time the data management logic 140 updates a page of data in a respective block of non-volatile memory device 620, the parity information generator 635 updates the respective parity page for the block. For example, when a page of non-parity data is written to block 0, the data management logic 140 updates parity page 670 with a new value; when a page of non-parity data is written to block 1, the data management logic 140 updates parity page 671 with a new value; and so on.

Figure 7:
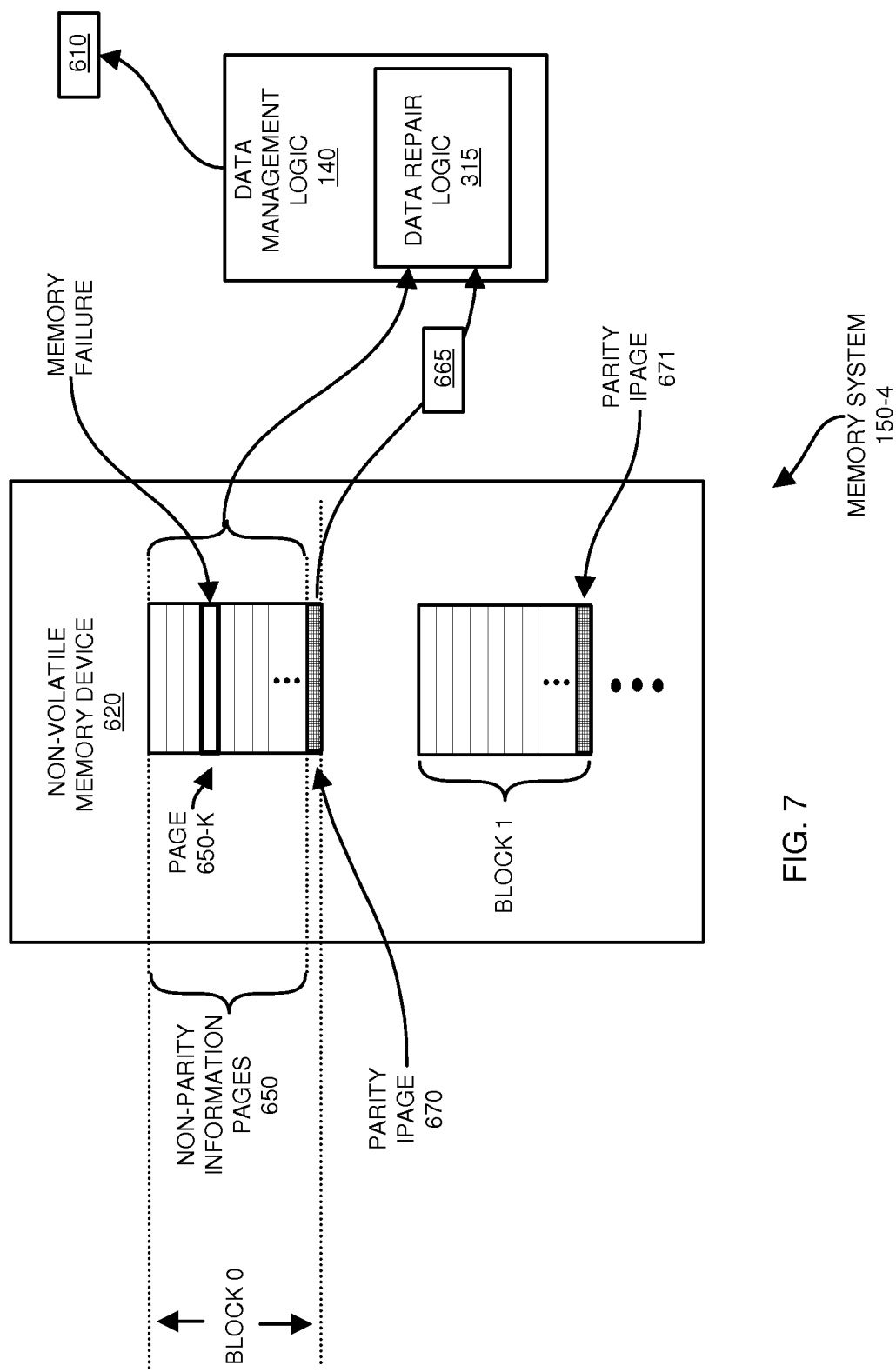
FIG. 7 is an example diagram illustrating use of parity information to recover from a memory failure at a page level according to embodiments herein.

FIG. 7 is an example diagram illustrating use of parity information to recover from a memory failure according to embodiments herein.

Assume there is memory failure associated with retrieval of non-parity data previously stored in page 650-K stored in block 0. The memory failure may occur for one of multiple reasons. For example, any or all data in storage cells associated with page 650-K may be inaccessible.

To reproduce inaccessible non-parity data stored in page 650-K, the data repair logic 315 of the data management logic 140 initiates retrieval of all of non-parity information pages 650 except the failing page 650-K.

In accordance with the above example in which block 0 includes 4 pages, the data repair logic 315 retrieves the first page (data bits 11001 . . . ), the second page (data bits 10111 . . . ), and the parity page 670 (data bits 11110 . . . ).

The data repair logic 315 generates the value for page 650-K based on:

page 650-K=(11001 . . . ) XOR (10111 . . . ) XOR (11110 . . . )=(10000 . . . )

In this manner, the parity information stored in a page of a respective block X of non-volatile memory device 620 can be used to reproduce respective non-parity information stored in a failing page.

Accordingly, embodiments herein include retrieving non-failing pages of non-parity data and a respective parity page of data to repair a corrupted or unavailable page in a block.

Figure 8:
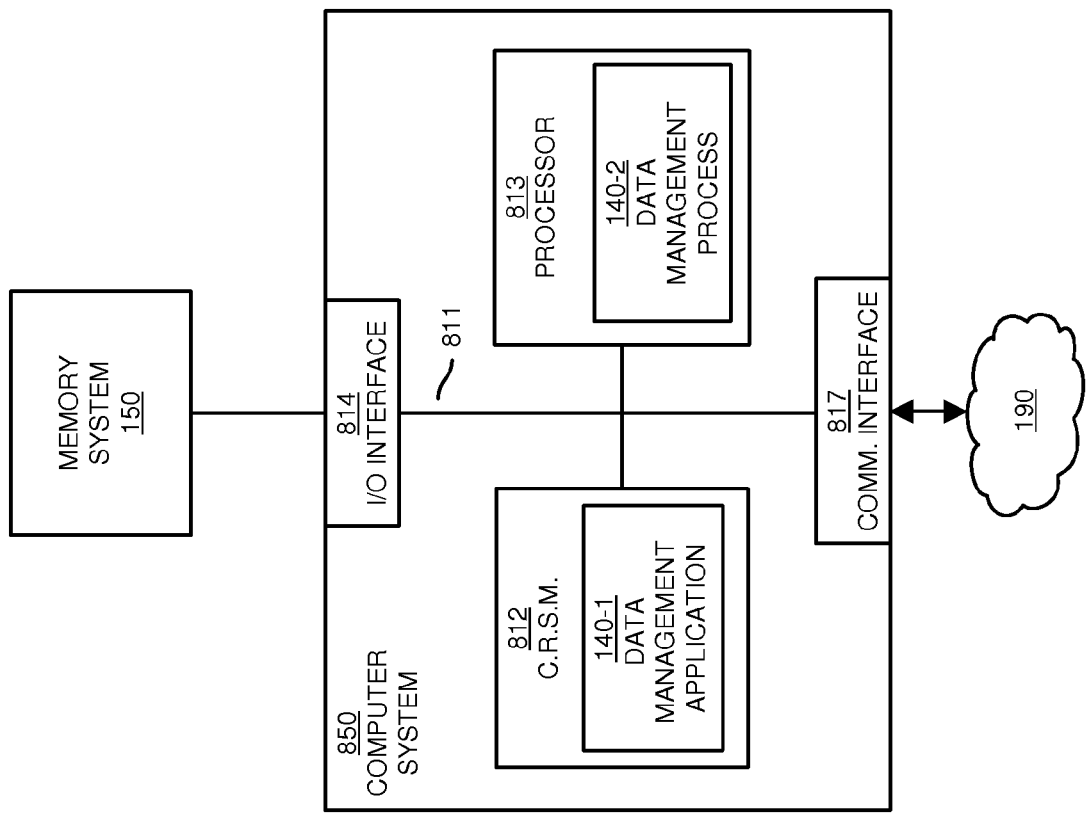
FIG. 8 is an example diagram illustrating a computer architecture that can be used to execute one or more methods according to embodiments herein.

FIG. 8 is an example block diagram of a computer system for implementing any of the operations as discussed herein according to embodiments herein.

Computer system 850 can be configured to execute any of the operations with respect to data management logic 140 and/or corresponding resources such as parity information generator, memory repair logic, etc.

As shown, computer system 850 of the present example can include an interconnect 811 that couples computer readable storage media 812 such as a physical non-transitory type of media (i.e., any type of physical hardware storage medium) in which digital information can be stored and retrieved, a processor 813 (i.e., one or more processor devices), I/O interface 814, communications interface 817, etc.

As shown, I/O interface 814 provides computer system 850 connectivity to data stored in memory devices 220.

Computer readable storage medium 812 can be any physical or tangible hardware storage device or devices such as memory, optical storage, hard drive, floppy disk, etc. In one embodiment, the computer readable storage medium 812 (e.g., a computer readable hardware storage) stores instructions and/or data.

In one embodiment, communications interface 817 enables the computer system 850 and respective processor 813 to communicate over a resource such as network 190 to retrieve information from remote sources and communicate with other computers. I/O interface 814 enables processor 813 to retrieve stored information from a repository such as memory devices 220.

As shown, computer readable storage media 812 is encoded with data management application 140-1 (e.g., software, firmware, etc.) executed by processor 813. Data management application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in data management application 140-1 stored on computer readable storage medium 812.

Execution of the data management application 140-1 produces processing functionality such as data management process 140-2 in processor 813. In other words, the data management process 140-2 associated with processor 813 represents one or more aspects of executing data management application 140-1 within or upon the processor 813 in the computer system 850.

Those skilled in the art will understand that the computer system 850 can include other processes and/or software and hardware components, such as an operating system that controls allocation and use of hardware resources, software resources, etc., to execute data management application 140-1.

In accordance with different embodiments, note that computer system 850 may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device.

Functionality supported by the different resources will now be discussed via flowcharts in FIGS. 9-10. Note that the processing in the flowcharts below can be executed in any suitable order.

Figure 9:
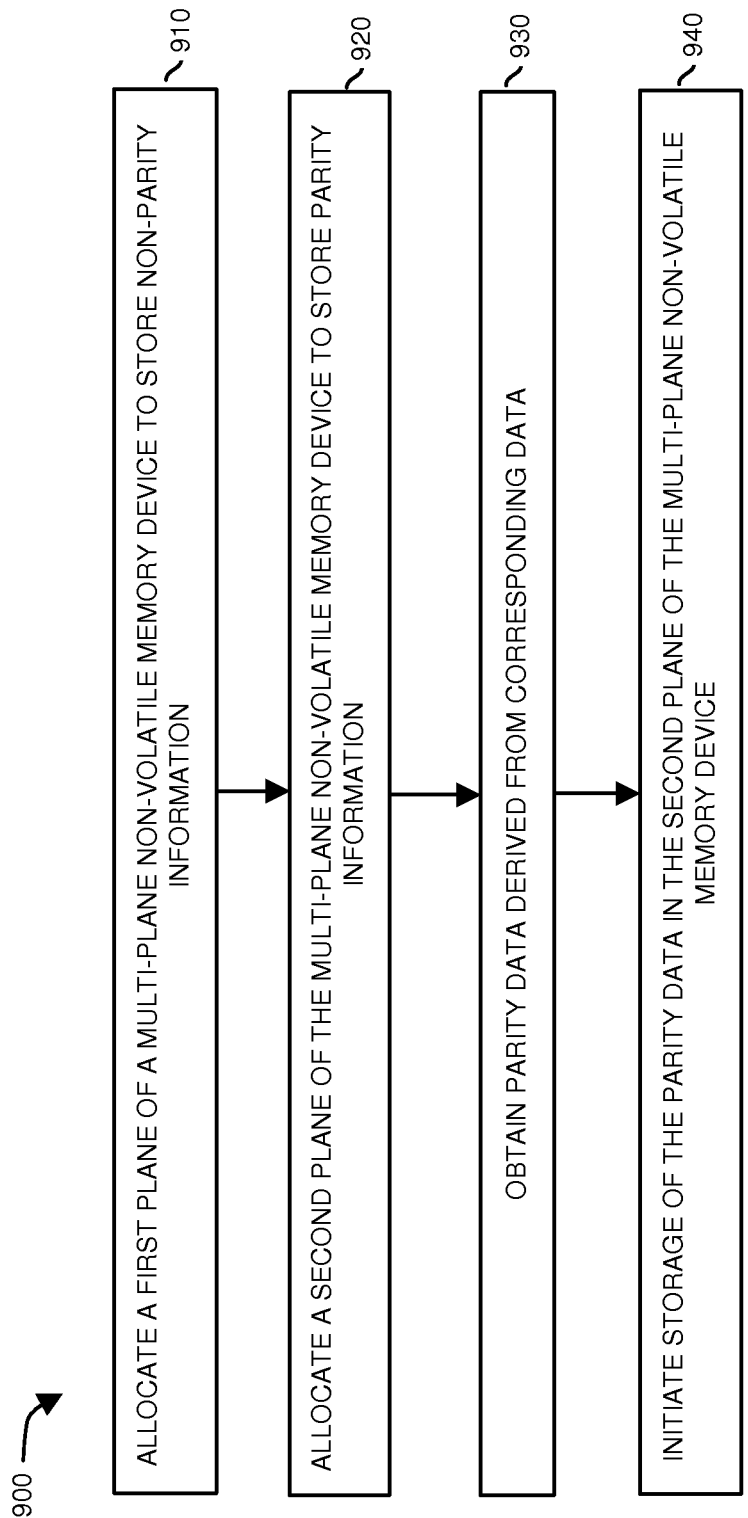
FIGS. 9 and 10 are example flowcharts illustrating methods according to embodiments herein.

FIG. 9 is a flowchart 900 illustrating an example method according to embodiments. Note that there will be some overlap with respect to concepts as discussed above.

In processing block 910, the data management logic 140 allocates a first plane 121-1 of a multi-plane non-volatile memory device 120 to store non-parity information.

In processing block 920, the data management logic 140 allocates a second plane 121-2 of the multi-plane non-volatile memory device 120 to store parity information.

In processing block 930, the data management logic 140 obtains parity data derived from corresponding data 110.

In processing block 940, the data management logic 140 initiates storage of the parity data 165 in the second plane 121-2 of the multi-plane non-volatile memory device 120.

Figure 10:
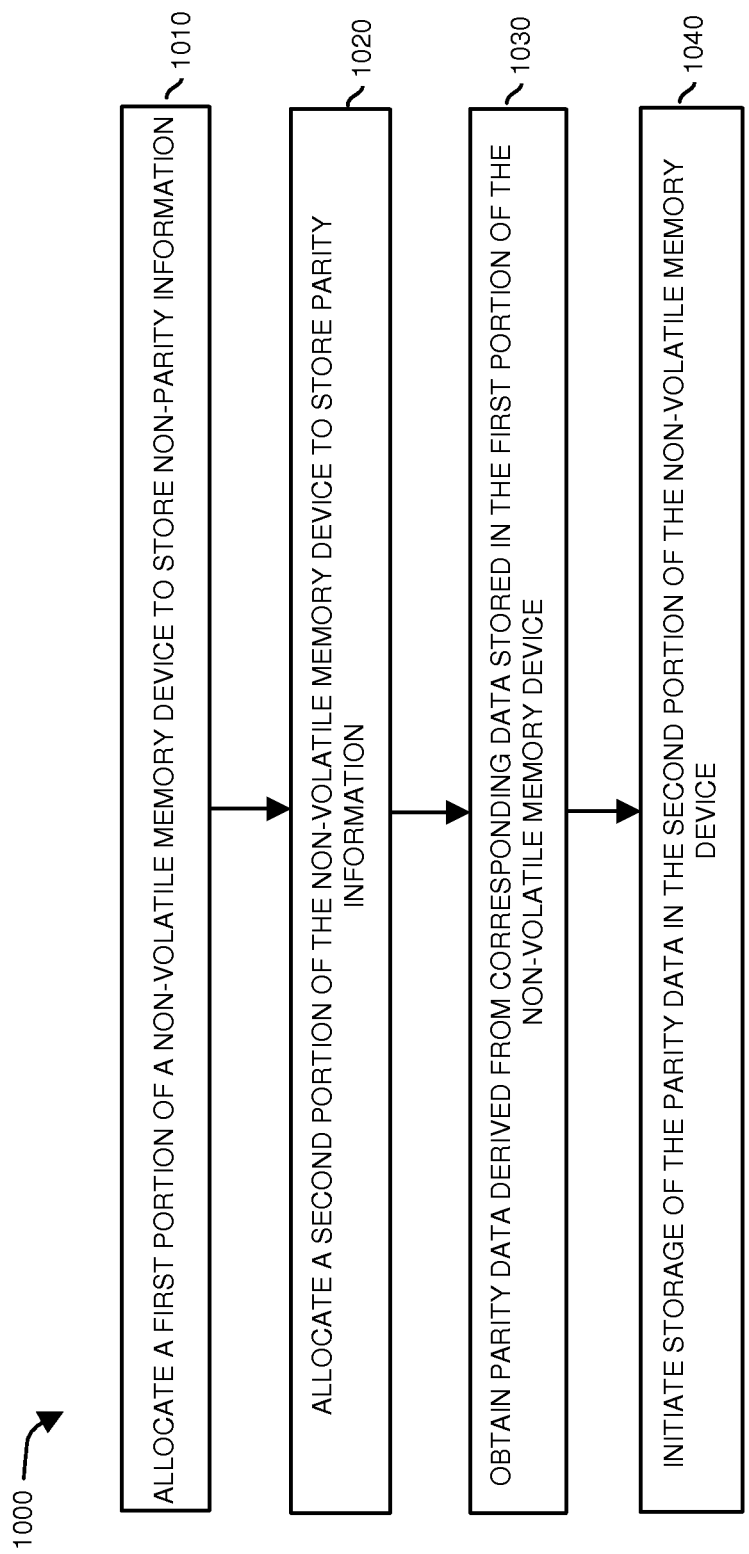

FIG. 10 is a flowchart 1000 illustrating an example method according to embodiments. Note that there will be some overlap with respect to concepts as discussed above.

In processing block 1010, allocates a first portion of a non-volatile memory device 420 to store non-parity information.

In processing block 1020, the data management logic 140 allocates a second portion of the non-volatile memory device 420 to store parity information.

In processing block 1030, the data management logic 140 obtains parity data derived from corresponding data stored in the first portion of the non-volatile memory device 420.

In processing block 1040, the data management logic 140 initiates storage of the parity data in the second portion of the non-volatile memory device 420.

Figure 11:
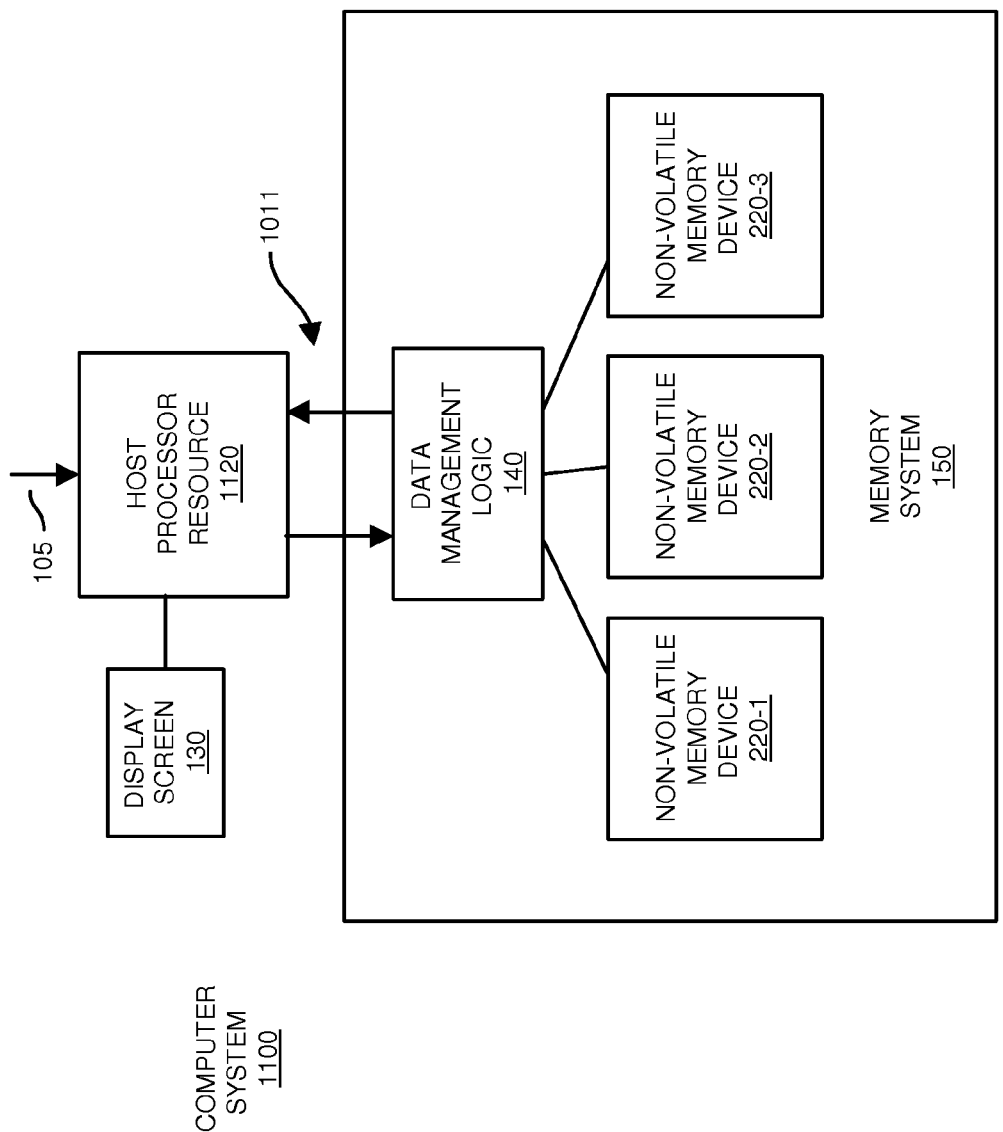
FIG. 11 is an example diagram illustrating use of a memory system in a respective computer system according to embodiments herein.

FIG. 11 is an example diagram illustrating use of a memory system in a respective computer system according to embodiments herein.

As shown, computer system 1100 can include a host processor resource 1120 and memory system 150 (e.g., any of memory systems 150-1, 150-2, 150-3, . . . ). Host processor resource 1120 can be or include one or more processor devices. Additionally, computer system 1100 can be any suitable type of resource such as a personal computer, cellular phone, mobile device, camera, etc., using memory system 150 to store data.

By way of a non-limiting example, memory system 150 can be a solid-state drive used to store data.

In one embodiment, host processor resource 1120 has access to memory system 150 via interface 1011. Interface 1011 can be any suitable link enabling data transfers. For example, the interface 1011 can be a SCSI (Small Computer System Interface), SAS (Serial Attached SCSI), SATA (Serial Advanced Technology Attachment), USB (Universal Serial Bus), Pcie (Peripheral Component Interconnect Express) bus, etc.

Via interface 1011, the host processor resource 1120 of computer system 1100 is able to retrieve data from and store data in memory system 150.

As an example, assume that the host processor resource 1120 receives a request to perform a respective function as specified by input 105 from a user. Host processor resource 1120 executes the function, which can include transmitting a request over interface 1011 to data management logic 140 for retrieval of data at a specified logical address. The data management logic 140 maps the logical address to an appropriate physical address and retrieves the data from non-volatile memory devices 220. Data management logic 140 transmits the retrieved data to host processor resource 1120.

In one non-limiting example embodiment, the host processor resource initiates display of an image on display screen 130 depending on the data received from the data management logic 140.

As a further example, the host processor resource 1120 can receive a request to perform a respective function as specified by input 105 from a user. Host processor resource 1120 executes the function and communicates with data management logic 140 to store data at a logical address as specified by the host processor resource 1120. In response to receiving the request, the data management logic 140 maps the logical address to an appropriate physical address and stores the received data in a corresponding location of the non-volatile memory devices 220.

The data management logic 140 performs the parity functions as discussed herein to ensure data integrity. That is, if a memory failure is detected, the data management logic 140 utilizes the stored parity information to recover lost data.

Different Permutations of Disclosed Example Embodiments

A first example embodiment as discussed herein includes an apparatus, the apparatus comprises: a multi-plane non-volatile memory device including at least a first plane and a second plane, the first plane allocated to store non-parity information, the second plane allocated to store parity information. The apparatus further includes processing logic such as data management logic to: obtain parity data derived from corresponding data; and initiate storage of the parity data in the second plane of the multi-plane non-volatile memory device.

The first example embodiment can be implemented along with a combination of any of one or more of the following features to produce yet different embodiments:

For example, in accordance with a further embodiment, the processing logic is further configured to initiate storage of a segment of the corresponding data in the first plane of the multi-plane non-volatile memory device.

In yet another embodiment, the processing logic is further configured to initiate the storage of the segment in the first plane and the storage of the parity data in the second plane of the multi-plane non-volatile memory device at substantially the same time.

In another embodiment, the first plane of the multi-plane non-volatile memory device can be allocated to store at least a portion of the corresponding data.

The multi-plane non-volatile memory device can be a first multi-plane non-volatile memory device in a memory system. The memory system can further include multiple multi-plane non-volatile memory devices. The processing logic such as the data management logic can be further configured to partition the corresponding data into multiple segments of data and store the multiple segments of data as a data stripe across the multiple multi-plane non-volatile memory devices of the memory system.

In still further embodiments, the processing logic can be further configured to store a first segment of the multiple segments in a first plane of a second multi-plane non-volatile memory device in the memory system. The processing logic can be configured to store a second segment of the multiple segments in a second plane of the second multi-plane non-volatile memory device in the memory system, the parity data derived from application of a logical operation to at least the first segment and the second segment.

In one embodiment, the corresponding data includes the first segment and at least a second segment. Additionally, the multi-plane non-volatile memory device is a first non-volatile memory device. The processing logic is further configured to store the second segment of the corresponding data in a second non-volatile memory device. In further embodiments, the processing logic is further configured to, initiate, at substantially the same time: i) storage of the first segment of the corresponding data in the first plane of the first non-volatile memory device, ii) storage of the parity data in the second plane of the first non-volatile memory device, and iii) storage of the second segment in the second non-volatile memory device.

In yet further embodiments, the processing logic is further configured to: retrieve the parity data stored in the second plane of the multi-plane non-volatile memory device; and utilize the retrieved parity data to repair a corrupted segment of the corresponding data, the corresponding data stored across multiple non-volatile memory devices.

As a further extension of the first example embodiment, the multi-plane non-volatile memory device can be a first multi-plane non-volatile memory device. The processing logic can be configured to: obtain a portion of the corresponding data from a first plane of a second multi-plane non-volatile memory device; and utilize the obtained portion of the corresponding data and the retrieved parity data to repair the corrupted segment of the corresponding data, the corrupted portion of the corresponding data stored in a second plane of the second multi-plane non-volatile memory device.

A computer can be configured to include the apparatus (first example embodiment) as discussed herein. The apparatus can be a memory system including one or more multi-plane non-volatile memory devices. The computer system can further comprise one or more processor devices that are configured to communicate with the processing logic in the memory system.

In accordance with further embodiments, a computer system can be configured to include the apparatus. The multi-plane non-volatile memory device can be one of multiple multi-plane non-volatile memory devices in a memory system such as a solid-state drive to which the computer system has access. The computer system can include a display screen on which to render an image based at least in part on the corresponding data stored in the solid state-drive.

The first example embodiment can be implemented to execute any of the method operations as discussed herein.

A second example embodiment as discussed herein includes a method, the method comprises: allocating a first plane of a multi-plane non-volatile memory device to store non-parity information; allocating a second plane of the multi-plane non-volatile memory device to store parity information; obtaining parity data derived from corresponding data; and initiating storage of the parity data in the second plane of the multi-plane non-volatile memory device.

The second example embodiment can be implemented along with any of one or more of the following features to produce yet further embodiments below:

In one embodiment, the method embodiment includes initiating storage of a segment of the corresponding data in the first plane of the multi-plane non-volatile memory device.

In yet further embodiments, the method embodiment includes initiating the storage of the segment in the first plane and the storage of the parity data in the second plane of the multi-plane non-volatile memory device at substantially the same time.

In still further embodiments, allocating the first plane of the multi-plane non-volatile memory device to store non-parity information includes allocating the first plane of the multi-plane non-volatile memory device to store at least a portion of the corresponding data.

As a further extension of the second example embodiment, the multi-plane non-volatile memory device is a first multi-plane non-volatile memory device in a memory system. The memory system can include multiple multi-plane non-volatile memory devices. The method can further include partitioning the corresponding data into multiple segments of data; and storing the multiple segments of data as a data stripe across the multiple multi-plane non-volatile memory devices of the memory system.

In accordance with another embodiment, the method embodiments as discussed herein can include: storing a first segment of the multiple segments in a first plane of a second multi-plane non-volatile memory device in the memory system; and storing a second segment of the multiple segments in a second plane of the second multi-plane non-volatile memory device in the memory system, the parity data derived from application of a logical operation to at least the first segment and the second segment.

In another non-limiting example embodiment, the corresponding data can include the first segment and at least a second segment. The multi-plane non-volatile memory device is a first non-volatile memory device. The method further comprises: storing the second segment of the corresponding data in a second non-volatile memory device. In one non-limiting example embodiment, at substantially the same time, the processing logic initiates: i) storage of the first segment of the corresponding data in the first plane of the first non-volatile memory device, ii) storage of the parity data in the second plane of the first non-volatile memory device, and iii) storage of the second segment in the second non-volatile memory device.

In accordance with yet another embodiment, the method includes retrieving the parity data stored in the second plane of the multi-plane non-volatile memory device; and utilizing the retrieved parity data to repair a corrupted segment of the corresponding data. The corresponding data can be stored or striped across multiple non-volatile memory devices.

In further embodiments, the multi-plane non-volatile memory device is a first multi-plane non-volatile memory device. Utilizing the retrieved parity data to repair the corrupted segment of the corresponding data can include: obtaining a portion of the corresponding data from a first plane of a second multi-plane non-volatile memory device; and utilizing at least the obtained portion of the corresponding data and the retrieved parity data to repair the corrupted segment of the corresponding data, the corrupted portion of the corresponding data stored in a second plane of the second multi-plane non-volatile memory device.

A third example embodiment as discussed herein includes an apparatus, the apparatus comprises: a non-volatile memory device including at least a first portion and a second portion, the first portion allocated to store non-parity information, the second portion allocated to store parity information; and processing logic configured to: obtain parity data derived from corresponding data stored in the first portion of the non-volatile memory device; and initiate storage of the parity data in the second portion of the non-volatile memory device.

The third example embodiment can be implemented along with any of one or more of the following features to produce yet different embodiments: For example, in one embodiment, the processing logic can be further configured to:

initiate the storage of the parity data in the second portion of the non-volatile memory device subsequent to storing the corresponding data in the first portion of the non-volatile memory device.

In another embodiment, the first portion includes a group of multiple blocks, each of which stores multiple pages of data. The second portion includes a block of multiple pages to store the parity data.

In further example embodiments, the processing logic such as data management logic applies a logical bit operation to the multiple blocks in the first portion to derive the parity data stored in the block of the second portion.

By further way of a non-limiting example, the first portion can include a group of multiple pages in a block. The second portion can be a page in the block allocated to store the parity data.

In accordance with a further embodiment, the processing logic applies a logical bit operation to the group of multiple pages in the block to derive the parity data stored in the page of the block allocated to store the parity data.

In yet another embodiment, the processing logic is configured to: obtain at least a portion of data stored in the first portion of the non-volatile memory device and the parity data stored in the second portion of the non-volatile memory device to repair a corrupted portion of data in the first portion.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs, firmware, logic, etc. to perform operations as disclosed herein. One such embodiment comprises a computer program product including a non-transitory computer-readable storage medium (i.e., any computer readable hardware storage medium) on which software instructions are encoded for subsequent execution. The instructions, when executed in a computerized device having one or more processors, program and/or cause the processor to perform the operations disclosed herein. Such arrangements can be provided as software, firmware, code, instructions, data (e.g., data structures), etc., arranged or encoded on a non-transitory computer readable storage medium such as an optical medium (e.g., CD-ROM), floppy disk, hard disk, memory, etc., or other a medium such as firmware or shortcode in one or more ROM, RAM, PROM, etc., or as logic in an Application Specific Integrated Circuit (ASIC), etc. The software or firmware or other such configurations can be installed onto a computerized device to cause the computerized device to perform the techniques explained herein.

Accordingly, embodiments herein are directed to an apparatus, a method, a system, a computer program product, etc., that supports operations as discussed herein.

One embodiment includes a computer readable storage medium and/or system having instructions, logic, etc., stored thereon to manage data in a memory system including one or more non-volatile memory devices. The instructions, and/or logic, when executed by at least one processor device of a respective computer, cause the at least one processor device to: allocate a first plane of a multi-plane non-volatile memory device to store non-parity information; allocate a second plane of the multi-plane non-volatile memory device to store parity information; obtain parity data derived from corresponding data; and initiate storage of the parity data in the second plane of the multi-plane non-volatile memory device.

Another embodiment includes a computer readable storage medium and/or system having instructions, logic, etc., stored thereon to manage data in a memory system including one or more non-volatile memory devices. The instructions, and/or logic, when executed by at least one processor device of a respective computer, cause the at least one processor device to: allocate a first portion of a non-volatile memory device to store non-parity information; allocate a second portion of the non-volatile memory device to store parity information; obtain parity data derived from corresponding data stored in the first portion of the non-volatile memory device; and initiate storage of the parity data in the second portion of the non-volatile memory device.

Note that any of the processing as discussed herein can be performed in any suitable order.

It is to be understood that the apparatus, system, method, apparatus, instructions on computer readable storage media, etc., as discussed herein also can be embodied strictly as a software program, firmware, as a hybrid of software, hardware and/or firmware, or as hardware alone such as within a processor device, within an operating system or a within a software application, etc.

Additionally, note that although each of the different features, techniques, configurations, etc., herein may be discussed in different places of this disclosure, it is intended, where suitable, that each of the concepts can optionally be executed independently of each other or in combination with each other. Any permutation of the disclosed features is possible. Accordingly, the one or more embodiments as described herein can be embodied and viewed in many different ways.

Note further that techniques herein are well suited for use in memory systems including one or more non-volatile memory device. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the embodiments herein are presented in the following claims.

The invention claimed is:

1. A method comprising:
    allocating a first plane of a multi-plane non-volatile memory device to store non-parity information;
    allocating a second plane of the multi-plane non-volatile memory device to store parity information;
    obtaining parity data derived from corresponding data;
    initiating storage of the parity data for the corresponding data striped across the first plane and the second plane of the multi-plane non-volatile memory device in the second plane of the multi-plane non-volatile memory device;
    retrieving the parity data stored in the second plane of the multi-plane non-volatile memory device; and
    utilizing the retrieved parity data to restore an unavailable segment of the corresponding data, the corresponding data stored across multiple non-volatile memory devices.

2. The method as in claim 1 further comprising:
    initiating storage of a segment of the corresponding data in the first plane of the multi-plane non-volatile memory device.

3. The method as in claim 2 further comprising:
    initiating the storage of the segment in the first plane and the storage of the parity data in the second plane of the multi-plane non-volatile memory device at substantially the same time.

4. The method as in claim 1, wherein allocating the first plane of the multi-plane non-volatile memory device to store non-parity information includes:

allocating the first plane of the multi-plane non-volatile memory device to store at least a portion of the corresponding data.

5. The method as in claim 1, wherein the multi-plane non-volatile memory device is a first multi-plane non-volatile memory device in a memory system including multiple multi-plane non-volatile memory devices, the method further comprising:

partitioning the corresponding data into multiple segments of data; and storing the multiple segments of data as a data stripe across the multiple multi-plane non-volatile memory devices of the memory system.

6. The method as in claim 5 further comprising:

storing a first segment of the multiple segments in a first plane of a second multi-plane non-volatile memory device in the memory system; and storing a second segment of the multiple segments in a second plane of the second multi-plane non-volatile memory device in the memory system, the parity data derived from application of a logical operation to at least the first segment and the second segment.

7. The method as in claim 2, wherein the segment is a first segment, the corresponding data including the first segment and at least a second segment; and wherein the multi-plane non-volatile memory device is a first non-volatile memory device, the method further comprising:

storing the second segment of the corresponding data in a second non-volatile memory device.

8. The method as in claim 7 further comprising:

at substantially the same time, initiating: i) storage of the first segment of the corresponding data in the first plane of the first non-volatile memory device, ii) storage of the parity data in the second plane of the first non-volatile memory device, and iii) storage of the second segment in the second non-volatile memory device.

9. The method as in claim 1, wherein the multi-plane non-volatile memory device is a first multi-plane non-volatile memory device;

wherein utilizing the retrieved parity data to repair the unavailable segment of the corresponding data includes:

obtaining a portion of the corresponding data from a first plane of a second multi-plane non-volatile memory device;

utilizing at least the obtained portion of the corresponding data and the retrieved parity data to restore the unavailable segment of the corresponding data, the unavailable segment of the corresponding data stored in a second plane of the second multi-plane non-volatile memory device.

10. An apparatus comprising:

a multi-plane non-volatile memory device including at least a first plane and a second plane, the first plane allocated to store non-parity information, the second plane allocated to store parity information;

processing logic configured to:

obtain parity data derived from corresponding data;

initiate storage of the parity data for the corresponding data striped across the first plane and the second plane of the multi-plane non-volatile memory device in the second plane of the multi-plane non-volatile memory device;

retrieve the parity data stored in the second plane of the multi-plane non-volatile memory device; and utilize the retrieved parity data to restore a corrupted segment of the corresponding data, the corresponding data stored across multiple non-volatile memory devices.

11. The apparatus as in claim 10, wherein the processing logic is further configured to:

initiate storage of a segment of the corresponding data in the first plane of the multi-plane non-volatile memory device.

12. The apparatus as in claim 11, wherein the processing logic is further configured to:

initiate the storage of the segment in the first plane and the storage of the parity data in the second plane of the multi-plane non-volatile memory device at substantially the same time.

13. The apparatus as in claim 10, wherein the first plane of the multi-plane non-volatile memory device is allocated to store at least a portion of the corresponding data.

14. The apparatus as in claim 10, wherein the multi-plane non-volatile memory device is a first multi-plane non-volatile memory device in a memory system including multiple multi-plane non-volatile memory devices, the processing logic further configured to:

partition the corresponding data into multiple segments of data; and store the multiple segments of data as a data stripe across the multiple multi-plane non-volatile memory devices of the memory system.

15. The apparatus as in claim 14, wherein the processing logic is further configured to:

store a first segment of the multiple segments in a first plane of a second multi-plane non-volatile memory device in the memory system; and store a second segment of the multiple segments in a second plane of the second multi-plane non-volatile memory device in the memory system, the parity data derived from application of a logical operation to at least the first segment and the second segment.

16. The apparatus as in claim 10, wherein the multi-plane non-volatile memory device is a first multi-plane non-volatile memory device;

wherein the processing logic is configured to:

obtain a portion of the corresponding data from a first plane of a second multi-plane non-volatile memory device;

utilize the obtained portion of the corresponding data and the retrieved parity data to restore the corrupted segment of the corresponding data, the corrupted segment of the corresponding data stored in a second plane of the second multi-plane non-volatile memory device.

17. A computer system including the apparatus in claim 10, wherein the apparatus is a memory system including the multi-plane non-volatile memory device, the computer system further comprising:

at least one processor device configured to communicate with the processing logic and store the corresponding data in the memory system.

18. A computer system including the apparatus in claim 10, wherein the multi-plane non-volatile memory device is one of multiple multi-plane non-volatile memory devices in a solid-state drive to which the computer system has access.

19. The computer system as in claim 18, the computer system further comprising:

a display screen on which to render an image based at least in part on the corresponding data stored in the solid state-drive.

20. Computer-readable storage hardware having instructions stored thereon, the instructions, when carried out by at least one processing device, cause the at least one processing device to perform operations of:

obtaining parity data derived from corresponding data, at least a segment of the corresponding data stored in a first plane of a multi-plane non-volatile memory device;

accessing a second plane of a multi-plane non-volatile memory device, the second plane in the multi-plane non-volatile memory device allocated to store parity information;

initiating storage of the parity data for the corresponding data striped across the first plane and the second plane of the multi-plane non-volatile memory device in the second plane of the non-volatile memory device;

retrieving the parity data stored in the second plane of the multi-plane non-volatile memory device: and utilizing the retrieved parity data to restore an unavailable segment of the corresponding data, the corresponding data stored across multiple non-volatile memory devices.

21. An apparatus comprising:

a non-volatile memory device including at least a first portion and a second portion, the first portion allocated to store non-parity information, the second portion allocated to store parity information;

processing logic configured to:

obtain parity data derived from corresponding data stored in the first portion of the non-volatile memory device;

initiate storage of the parity data for the corresponding data striped across the first portion and the second portion of the multi-plane non-volatile memory device in the second portion of the non-volatile memory device;

retrieve the parity data stored in the second portion of the non-volatile memory device; and utilize the retrieved parity data to restore an unavailable segment of the corresponding data, the corresponding data striped across the first portion and the second portion of the multi-plane non-volatile memory device.

22. The apparatus as in claim 21, wherein the processing logic is further configured to:

initiate the storage of the parity data in the second portion of the non-volatile memory device subsequent to storing the corresponding data in the first portion of the non-volatile memory device.

23. The apparatus as in claim 21, wherein the first portion includes a grouping of multiple blocks, each of which stores multiple pages of data; and wherein the second portion includes a parity block of multiple pages to store the parity data associated with data in the grouping of multiple blocks.

24. The apparatus as in claim 23, wherein the processing logic applies a logical bit operation to data in the multiple blocks in the first portion to derive the parity data stored in the parity block of the second portion.

25. The apparatus as in claim 21, wherein the first portion includes a group of multiple pages in a particular block of the non-volatile memory device; and wherein the second portion is a parity page in the particular block, the parity page allocated to store the parity data.

26. The apparatus as in claim 25, wherein the processing logic applies a logical bit operation to the group of multiple pages in the block to derive the parity data stored in the parity page of the particular block.

27. The apparatus as in claim 21, wherein the processing logic is configured to:

obtain at least a portion of data stored in the first portion of the non-volatile memory device and the parity data stored in the second portion of the non-volatile memory device to restore unavailable data in the first portion.

* * * * *